UNITED STATES PATENT OFFICE.

LUDWIG HESS, OF BERLIN-BRITZ, GERMANY.

ORTHOVANADIC-ACID ESTERS AND THEIR SOLUTIONS.

1,133,961.  Specification of Letters Patent.  Patented Mar. 30, 1915.

No Drawing.  Application filed February 6, 1914. Serial No. 817,056.

*To all whom it may concern:*

Be it known that I, Dr. LUDWIG HESS, a subject of the German Emperor, residing at Berlin-Britz, Germany, have invented certain new and useful Improvements Relating to Orthovanadic-Acid Esters and Their Solutions, of which the following is a specification.

I have found that, contrary to the hitherto existing statements in the literature, vanadium pentoxid dissolves in the most varied primary, secondary and tertiary mono- and polyhydric alcohols with the formation of esters, and that from the solutions in the primary, secondary and tertiary alcohols esters of the constitution $R_3VO_4$ (R = radical) can be isolated which are either liquid or solid, colored or colorless according to the nature of the alcohol employed.

The process for producing such esters or ester solutions is as follows:—

*I. Primary alcohols.*—Ethyl alcohol for example is boiled with an excess of vanadium pentoxid for several hours under a reflux condenser, the excess of alcohol driven off and the ester which remains behind distilled over *in vacuo*. Its formula is $$(C_2H_5)_3VO_4.$$

The ester is a slightly colored liquid, which at 15° C. has a density of 1.167. At 26 mm. pressure its boiling point is 108.0° C.

*II. Secondary alcohols.*—Isopropyl alcohol for example is boiled with an excess of $V_2O_5$ for a prolonged time under a reflux condenser and the process then carried out in a manner similar to that described in I. The ester obtained is liquid, of a yellowish color and has at 21 mm. pressure a boiling point of 124° C.

*III. Tertiary alcohols.*—Amylene hydrate (dimethyl-ethyl carbinol) for example is boiled with $V_2O_5$ for a prolonged time under a reflux condenser. The almost colorless solution is then subjected to fractional distillation *in vacuo*, a colorless ester being obtained which according to analysis and determination of its molecular weight has the formula $$(C_5H_{11})_3VO_4.$$

Its specific gravity at 15° C. is 0.993 and its boiling point at a pressure of 19 mm. 161° C. When heated in the open air the ester gradually becomes colored light green and at about 206° it boils with decomposition. It dissolves easily in alcohol, ether, benzol, toluol, chloroform and acetone and on prolonged boiling with water is decomposed with the formation of amylene hydrate and the separation of vanadic acid.

*IV.*—If glycerin, glycol or benzyl alcohol be heated with $V_2O_5$, solutions of a slight yellow color are obtained which contain more or less vanadium in ester form.

The products obtained are intended for use for pharmaceutical purposes or as valuable raw materials.

It should be pointed out that except the two following points nothing has been known hitherto about obtaining vanadic acid esters.

1. W. Prandtl publishes a statement in the *Handbuch der Anorganischen Chemie by Gmelin-Kraut,* VII edition, III vol. pages 86 and 91 on the obtaining of an extremely unstable vanadic acid ethyl ester and its ethyl alcoholic solution of the composition $$V_2O_5.C_2H_5OH.H_2O,$$

and which he obtains by treating a melt of vanadium pentoxid and boric acid with alcohol. This statement does not concern this invention, as it is not known to convert $V_2O_5$ directly into esters by boiling with alcohol, and also no ester of the constitution $R_3VO_4$ was obtained. The new esters differ also from the known products in most cases by their unlimited stability.

2. Hall (*Journal Chem. Soc.* London 51, 1887, page 751) has prepared small quantities of orthovanadic acid ester from silver orthovanadates and halogen alkyls.

What I claim is:—

1. The process for the manufacture of ortho-vanadic acid esters, which consists in boiling an alcohol with vanadium pentoxid, substantially as described.

2. The process for the manufacture of ortho-vanadic acid esters, which consists in boiling an alcohol with vanadium pentoxid and separating the ester thus produced from the product of the reaction, by distillation, substantially as described.

3. The process for the manufacture of tertiary amyl-esters of ortho-vanadic acid, which consists in boiling amylene-hydrate with vanadium pentoxid under a reflux condenser, and separating the ester from the solution thus obtained, by fractional distillation *in vacuo*, substantially as described.

4. As a new product, the tertiary amyl-ester of ortho-vanadic acid $$(C_5H_{11})_3VO_4,$$

being a colorless liquid having at 15° C. a specific gravity of 0.993, boiling at 161° C. under a pressure of 19 mm., gradually assuming a light green color, when heated in the air to 100° C., boiling at about 206° C., while undergoing decomposition, easily soluble in alcohol, benzol, ether, chloroform, toluol, and acetone, the said liquid being decomposed by prolonged boiling with water, thereby forming amylene-hydrate and separating out vanadic acid, substantially as described.

In testimony whereof I have hereunto set my hand in presence of two subscribing witnesses.

Dr. LUDWIG HESS.

Witnesses:
 Marc Fuchs,
 Rudolf Gerber.